United States Patent Office 2,821,176
Patented Jan. 28, 1958

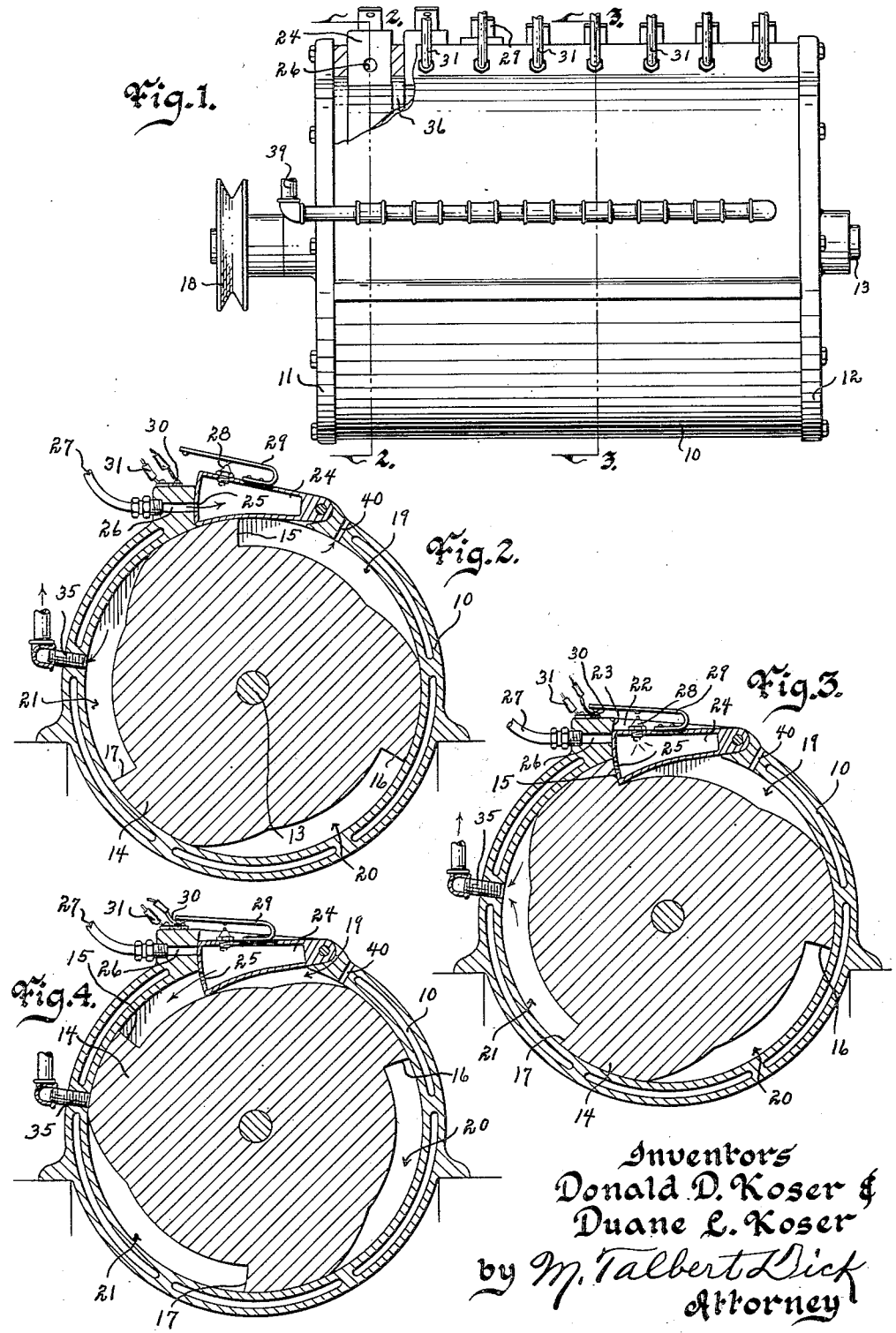

2,821,176

ROTARY INTERNAL COMBUSTION ENGINE

Donald D. Koser and Duane L. Koser, Sibley, Iowa

Application April 19, 1956, Serial No. 579,318

9 Claims. (Cl. 123—15)

This invention relates to internal combustion engines and more particularly to turbine type rotary engines.

Most internal combustion engines are of the reciprocating piston type. Such motors are of two or four cycle, the four cycle being the most popular and firing once per cylinder for each two complete revolutions of the crank shaft. Obviously, both the exhaust valves and the intake valves must be synchronized with and powered from the crank shaft. A spark plug is provided for each combustion chamber. Such engines are complicated, have many working parts and are highly inefficient. Considerable power is lost in just raising the valves against the valve springs. Furthermore, such engines have a given speed at which they function best. Any speed above or below this set speed seriously affects operation. If the engine is operated at high speed, the valve springs do not close the valves fast enough. If the strength of the valve springs is increased, the motor is not strong enough to compress them at low speeds. As a matter of fact, such engines must always be a compromise. Therefore, considerable attention has been given of late in the development of a rotary internal combusting engine. However, such rotary engines have followed two distinct types, i. e., the rotary meshed gear teeth pump system, and the rotary fan system. The pump system has been confounded by the necessary compression phase and the expelling of burned gases. The fan system, on the other hand, encounters slippage and great fuel costs. Our invention relates to the rotary motor pump system having meshing rotors.

Therefore, one of the principal objects of our invention is to provide a rotary internal combustion engine that has little slippage and no toothed meshing rotors.

A further object of this invention is to provide a rotary combustion engine that has its power thrust on the extreme periphery of the rotor.

A still further object of our invention is to provide a prime mover that uses its rotor as a fly wheel, as a piston, as a valve cam, and as an exhaust expeller.

A still further object of this invention is to provide a turbine type engine that has a plurality of explosions for each time its rotor and drive shaft makes one complete revolution.

A still further object of this invention is to provide an engine structure that may employ as many single rotors as desired.

A still further object of our invention is to provide a rotary combustion engine that needs only one spark plug per rotor.

A still further object of our invention is to provide an internal combustion engine that has no valve springs, and no crank shaft.

A still further object of our invention is to provide a light weight engine having few movable parts.

Still further objects of this invention are to provide an internal combustion engine that is economical in manufacture, durable in use, and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Fig. 1 is a side view of our engine ready for use and with a section cut away to more fully illustrate its construction, Fig. 2 is a cross sectional view of the engine taken on line 2—2 of Fig. 1 and shows the entrance of the fuel charge and the expelling of the exhaust gases, Fig. 3 is a cross sectional view of the engine taken on line 3—3 of Fig. 1 and shows the position of parts at time of explosion, and Fig. 4 is a cross sectional view of our engine immediately after an explosion.

In these drawings we have used the numeral 10 to designate the engine housing which is in the form of an elongated cylinder closed at each end by detachable bearing caps 11 and 12 respectively. The numeral 13 designates the drive shaft journaled through the ends 11 and 12 and extending concentrically with the inside of the housing and at its longitudinal center. A plurality of rotors or wheels 14 are secured on the shaft 13 and inside the housing, as shown in Fig. 1. These rotors may be of any suitable number and we show a housing capable of containing many. However, our engine will function with only one rotor wheel inasmuch as each rotor wheel assembly is an independent unit. We show three equally spaced apart shoulders 15, 16 and 17, formed in the periphery of each rotor. However, only one shoulder may be used, or any suitable number. From a front view these rotor wheels rotate inside the housing to the right. If desired the power takeoff pulley wheel 18, which is on the front end of the shaft, may be secured to its rear end and the motor turned around to rotate to the left. The trailing periphery of the rotor back of each shoulder 15, 16 and 17, is broken away to provide the three spaced apart cavities 19, 20, and 21 between the rotor wheel and the inside of the housing 10, as shown in Figs. 2, 3 and 4. In the top of the housing 10 and above each rotor wheel is an elongated opening 22. These openings are transverse of the longitudinal axis of the housing and longitudinal of the periphery of the rotor wheels. The right end of each opening 22, as appears in Fig. 1, is a concave shoulder 23, which corresponds to the concave shoulders 15, 16, and 17, of the adjacent rotor wheel. Hingedly mounted at its left end in each of the holes 22 is a fuel charge container 24. Each container is adapted to have its forward bottom end ride on the periphery of its adjacent rotor wheel. Each container will thereby swing upwardly and downwardly with the changing periphery of its rotor. To yieldingly hold the free end of a container downwardly on its adjacent rotor, we rely on its weight and the force of gravity. However, in very fast engines an auxiliary spring may be used to yieldingly depress the free end of each of the charge containers. As each rotor is a separate contained unit, we will refer to the operation of one unit, it being understood that all units are identical. The left free end of the fuel charge container is convex to closely conform with the concave structure of the shoulders 15, 16, 17, and 23, as shown in Fig. 3. Each fuel charge container is enclosed except for a passageway 25 in its free forward end. When a charge container 24 is riding on an extreme section of a rotor it will be in an elevated relative position as shown in Fig. 2, and its passageway 25 will be in communication with a fuel passageway 26 in the housing block and which communicates with the adjacent shoulder 23. The numeral 27 designates a conduit connected to the passageway 26 and adapted to be in communication with a source of fluid fuel under pressure. A throttle valve may be imposed in the conduit to regulate the passage of fuel. With a rotor 14 turning to the right, as appears in Fig. 1, the free end of the fuel container 24 will drop down back of a rotor shoulder, as shown in Fig. 3, thereby closing the passageway 26, but bringing the passageway 25 into direct contact with the rotor shoulder. At this moment the spark plug 28 extending through the top of the fuel container 24 is fired by any suitable electric means. In the drawings we show a spring contact arm 29 secured at one end to the fuel container and normally extending over the contact point of the spark plug. On the top of the engine is an electric contact point 30 capable of being contacted by the spring arm 29 and adapted to be in electrical communication with one side of a source of electric energy. The other side of such electric energy is connected to the engine housing by a lead wire 31. The spring arm and contact 30 are insulated from the engine housing and container 24. As the charge container moves further downwardly, the spring arm will part from the spark plug and break the contact. Thus, each member 24 is its own electric timing means. With a given fuel charge exploded the container 24 becomes an initial combustion chamber and the expanding gases pass through the passageway 25, contacting the adjacent shoulder of the rotor and forcing the rotor to turn to the right, as shown in Fig. 1. Unburned gases passing through the passageway 25 will be ignitted in the space in the rotor and back of the shoulder. The trailing periphery of the rotor back of the shoulder, however, will eventually merge with the extreme periphery of the rotor thereby lifting the container 24 to a position to receive its next fuel charge. In the right side of the motor block housing we have imposed an exhaust manifold 35. As the rotor continues to rotate its shoulder will pass the exhaust outlet and the burned gases will pass through the exhaust manifold, as shown in Fig. 3. The trailing periphery back of the shoulder will eventually merge into the extreme periphery of the rotor and as the rotor turns all burned gases will be forced out of the exhaust manifold. Thus, the rotor is its own burned gas scavenger and provides its own exhaust valve means without moving parts or springs. This same sequence of operation follows from one shoulder to the other. When three shoulders are used, as shown in the drawings, there are three power strokes in one revolution of one rotor. The rotors may be staggered relative to each other so that their shoulders fall at different positions relative to each other. A spacer washer 36 may be placed between rotors as shown in Fig. 1. Each rotor has its own individual fuel source. Therefore, any number of rotors may be shut off from power operation. If and when needed additional rotors may be placed into use merely by supplying them with the fuel charge. If desired all individual manifolds may be connected to a common exhaust pipe 39. In order that air back of a shoulder will not compress and objectionably raise a container 24, we have provided an air outlet hole 40 to the rear of each member 24. For making the rotors and members 24 gas and airtight, any suitable common compression rings or yieldable compression bars may be used. Also any adjustable means may be employed to move the members 24 toward the adjacent shoulders 23.

It will be appreciated that we have eliminated the usual crank shaft, crank arms, pistons, exhaust valves and complicated electrical timing. The rotor acts as its own fly wheel and merely selecting the number of and spacing of rotor shoulders the length of power stroke may be increased or decreased. The explosion is at the periphery of the rotor thereby giving maximum leverage. By the rotor rotating in one direction, reciprocating parts are eliminated thereby making for efficiency and smoothness of operation. The rotor automatically acts as a cam to raise and permit the fuel charge container 24 to drop.

Some changes may be made in the construction and arrangement of our rotary internal combustion engine without departing from the real spirit and purpose of our invention, and it is our intention to cover by our claims, any modified forms of structure or use of mechanical equivalents which may be reasonably included within their scope.

We claim:

1. In an internal combustion engine, a cylindrical housing having an opening in its side, a drive shaft rotatably longitudinally extending concentrically through said cylindrical housing, a rotor wheel on said shaft and inside said housing, a shoulder formed in the periphery of said rotor wheel, a shoulder on said cylindrical housing at one end of the opening therein, a fuel passageway extending through the said shoulder of said cylindrical housing, a fuel charge container hingedly secured in the opening of said cylindrical housing; said container being hinged at its end opposite from the said shoulder of said cylindrical housing, having its free end capable of sliding engagement with both of said shoulders, and having its bottom free end in slidable contact with the periphery of said rotor wheel, a passageway extending through the free end of said fuel charge container capable of communicating with said fuel passageway when said container is in an outward swung position and capable of communicating with the shoulder of said rotor wheel when in an inward swung position, a means for firing the fuel charge in said container when said container is adjacent the shoulder of said rotor wheel, and an exhaust port means in the side of said cylindrical housing.

2. In an internal combustion engine, a cylindrical housing having an opening in its side, a drive shaft rotatably longitudinally extending concentrically through said cylindrical housing, a rotor wheel on said shaft and inside said housing, a shoulder formed in the periphery of said rotor wheel, a shoulder on said cylindrical housing at one end of the opening therein, a fuel passageway extending through the said shoulder of said cylindrical housing, a fuel charge container hingedly secured in the opening of said cylindrical housing; said container being hinged at its end opposite from the said shoulder of said cylindrical housing, having its free end capable of sliding engagement with both of said shoulders, and having its bottom free end in slidable contact with the periphery of said rotor wheel, a passageway extending through the free end of said fuel charge container capable of communicating with said fuel passageway when said container is in an outward swung position and capable of communicating with the shoulder of said rotor wheel when in an inward swung position, a means for firing the fuel charge in said container when said container is adjacent the shoulder of said rotor wheel, and an exhaust port means in the side of said cylindrical housing, at a point forward of said shoulder of said rotor wheel when said shoulder is adjacent the free end of said fuel charge container.

3. In an internal combustion engine, a cylindrical housing having an opening in its side, a drive shaft rotatably longitudinally extending concentrically through said cylindrical housing, a rotor wheel on said shaft and inside said housing, a shoulder formed in the periphery of said rotor wheel, a shoulder on said cylindrical housing at one end of the opening therein, a fuel passageway extending through the said shoulder of said cylindrical housing, a fuel charge container hingedly secured in the opening of said cylindrical housing; said container being hinged at its end opposite from the said shoulder of said cylindrical housing, having its free end in the form of a conforming shoulder capable of sliding engagement with both of said shoulders, and having its bottom free end in slidable contact with the periphery of said rotor wheel, a passageway extending through the free end of said fuel charge container capable of communicating with said fuel passageway when said container is in an outward swung position and capable of communicating with the shoulder of said rotor wheel when in an inward swung position, a means for firing the fuel charge in said container when said container is adjacent the shoulder of said rotor wheel, and an exhaust port means in the side of said cylindrical housing.

4. In an internal combustion engine, a cylindrical housing having an opening in its side, a drive shaft rotatably longitudinally extending concentrically through said cylindrical housing, a rotor wheel on said shaft and inside said housing, a concave shoulder formed in the periphery of said rotor wheel, a concave shoulder on said cylindrical housing at one end of the opening therein, a fuel passageway extending through the said concave shoulder of said cylindrical housing, a fuel charge container hingedly secured in the opening of said cylindrical housing; said container being hinged at its end opposite from the said concave shoulder of said cylindrical housing, having its free end in the form of a convex conforming shoulder capable of sliding engagement with both of said concave shoulders, and having its bottom free end in slidable contact with the periphery of said rotor wheel, a passageway extending through the free end of said fuel charge container capable of communicating with said fuel passageway when said container is in an outward swung position and capable of communicating with the concave shoulder of said rotor wheel when in an inward swung position, a means for firing the fuel charge in said container when said container is adjacent the concave shoulder of said rotor wheel, and an exhaust port means in the side of said cylindrical housing.

5. In an internal combustion engine, a cylindrical housing having an opening in its side, a drive shaft rotatably longitudinally extending concentrically through said cylindrical housing, a rotor wheel on said shaft and inside said housing, a cutaway portion in the periphery of said rotor wheel to provide a space area and a shoulder, a shoulder on said cylindrical housing at one end of the opening therein, a fuel passageway extending through the said shoulder of said cylindrical housing, a fuel charge container hingedly secured in the opening of said cylindrical housing; said container being hinged at its end opposite from the said shoulder of said cylindrical housing, having its free end capable of sliding engagement with both of said shoulders, and having its bottom free end in slidable contact with the periphery of said rotor wheel, a passageway extending through the free end of said fuel charge container capable of communicating with said fuel passageway when said container is in an outward swung position and capable of communicating with the shoulder of said rotor wheel when in an inward swung position, a means for firing the fuel charge in said container when said container is adjacent the shoulder of said rotor wheel, and an exhaust port means in the side of said cylindrical housing.

6. In an internal combustion engine, a cylindrical housing having an opening in its side, a drive shaft rotatably longitudinally extending concentrically through said cylindrical housing, a rotor wheel on said shaft and inside said housing, a shoulder formed in the periphery of said rotor wheel, a shoulder on said cylindrical housing at one end of the opening therein, a fuel charge container hingedly secured in the opening of said cylindrical housing, a means for injecting a fuel charge into said container, said container being hinged at its end opposite from the said shoulder of said cylindrical housing, having its free end capable of sliding engagement with both of said shoulders, and having its bottom free end in slidable contact with the periphery of said rotor wheel, a passageway extending through the free end of said fuel charge container capable of communicating with said fuel passageway when said container is in an outward swung position and capable of communicating with the shoulder of said rotor wheel when in an inward swung position, a means for firing the fuel charge in said container when said container is adjacent the shoulder of said rotor wheel, and an exhaust port means in the side of said cylindrical housing.

7. In an internal combustion engine, a cylindrical housing having an opening in its side, a drive shaft rotatably longitudinally extending concentrically through said cylindrical housing, a rotor wheel on said shaft and inside said housing, a shoulder formed in the periphery of said rotor wheel, a shoulder on said cylindrical housing at one end of the opening therein, a fuel passageway extending through the said shoulder of said cylindrical housing, a fuel charge container hingedly secured in the opening of said cylindrical housing; said container being hinged at its end opposite from the said shoulder of said cylindrical housing, having its free end capable of sliding engagement with both of said shoulders, and having its bottom free end in slidable contact with the periphery of said rotor wheel, a means for holding said container in sliding engagement with the periphery of said rotor wheel, a passageway extending through the free end of said fuel charge container capable of communicating with said fuel passageway when said container is in an outward swung position and capable of communicating with the shoulder of said rotor wheel when in an inward swung position, a means for firing the fuel charge in said container when said container is adjacent the shoulder of said rotor wheel, and an exhaust port means in the side of said cylindrical housing.

8. In an internal combustion engine, a cylindrical housing having an opening in its side, a drive shaft rotatably longitudinally extending concentrically through said cylindrical housing, a rotor wheel on said shaft and inside said housing, a shoulder formed in the periphery of said rotor wheel, a shoulder on said cylindrical housing at one end of the opening therein, a fuel passageway extending through the said shoulder of said cylindrical housing, a fuel charge container hingedly secured in the opening of said cylindrical housing; said container being hinged at its end opposite from the said shoulder of said cylindrical housing, having its free end capable of sliding engagement with both of said shoulders, and having its bottom free end in slidable contact with the periphery of said rotor wheel, a passageway extending through the free end of said fuel charge container capable of communicating with said fuel passageway when said container is in an outward swung position and capable of communicating with the shoulder of said rotor wheel when in an inward swung position, a spark plug extending into said container, an electric contact point adapted to be electrically connected with a source of electric energy, and a conductor bar adjacent said spark plug, on said container and capable of engaging said contact point when said container is moved to an inward swung position.

9. In an internal combustion engine, a cylindrical housing having an opening in its side, a drive shaft rotatably longitudinally extending concentrically through said cylindrical housing, a rotor wheel on said shaft and inside said housing, a shoulder formed in the periphery of said rotor wheel, a shoulder on said cylindrical housing at one end of the opening therein, a fuel passageway extending through the said shoulder of said cylindrical housing, a fuel charge container hingedly secured in the opening of said cylindrical housing; said container being hinged at its end opposite from the said shoulder of said cylindrical housing, having its free end capable of sliding engagement with both of said shoulders, and having its bottom free end in slidable contact with the periphery of said rotor wheel, a passageway extending through the free end of said fuel charge container capable of communicating with said fuel passageway when said container is in an outward swung position and capable of communicating with the shoulder of said rotor wheel when in an inward swung position, a spark plug extending into said container, an electric contact point adapted to be electrically connected with a source of electric energy, and a spring arm conductor bar adjacent said spark plug, on said container and capable of engaging said contact point when said container is moved to an inward swung position.

References Cited in the file of this patent

UNITED STATES PATENTS 2,116,897    Jay ------------------ May 10, 1938